O. C. MONROE.
Feather Renovator.
No. 69,114.
Patented Sept. 24, 1867.
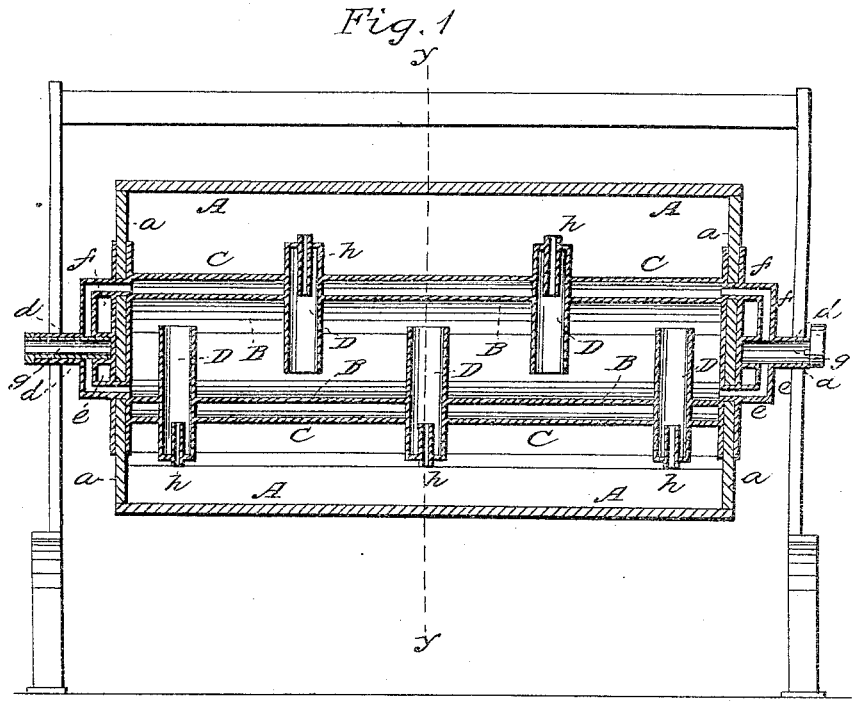
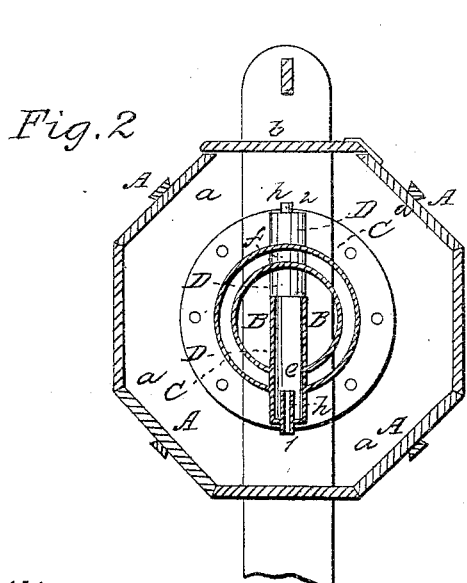
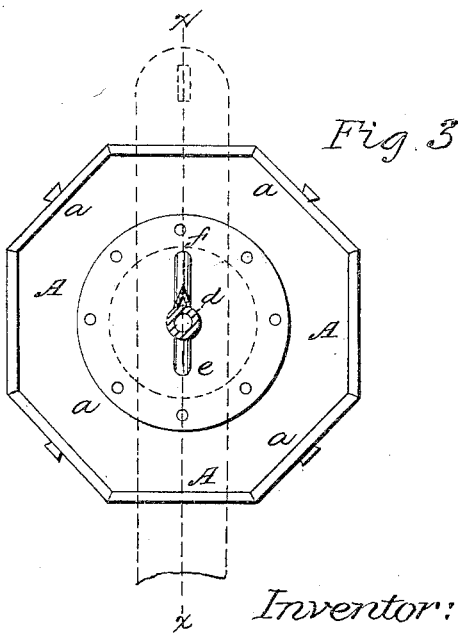
Witnesses:
Theo. Tusche
Wm Treurn
Inventor:
O C Monroe
Per. Munn & Co.

United States Patent Office.

OSSIAN C. MONROE, OF POULTNEY, VERMONT.

Letters Patent No. 69,114, dated September 24, 1867.

---

IMPROVED MACHINE FOR RENOVATING AND CLEANING FEATHERS.

---

The Schedule referred to in these Letters Patent and making part of the same.

---

TO ALL WHOM IT MAY CONCERN:

Be it known that I, OSSIAN C. MONROE, of Poultney, in the county of Rutland, and State of Vermont, have invented a new and improved Machine for Renovating and Cleaning Feathers; and I do hereby declare that the following is a full, clear, and exact description thereof, which will enable others skilled in the art to make and use the same, reference being had to the accompanying drawings, forming part of this specification, in which—

Figure 1 represents a vertical longitudinal sectional view of my improved machine for renovating feathers, the plane of section being indicated by the line $x\ x$, fig. 3.

Figure 2 is a vertical cross-section of the same, the plane of section being indicated by the line $y\ y$, fig. 1.

Figure 3 is an end elevation of the same.

Similar letters of reference indicate corresponding parts.

This invention relates to a new machine for cleaning feathers, which is so arranged that the feathers can be easily cleaned by the application of steam, without receiving any of the products of condensation, and can be dried, when cleaned, by the heated walls of the vessel in which they are held.

The invention consists in arranging within a cylindrical or polygonal vessel, which is provided with hollow bearings, and which is hung in a stationary frame, two cylindrical vessels, one within the other. The same are concentric with each other and with the outer vessel. An annular space is thus formed between the inner and central vessel for the passage of steam, and one between the central and outer vessel for holding feathers. The inner vessel is connected with the outer vessel by radial tubes extending into the inner vessel beyond or nearly to the axis of the same, and into the outer vessel, for the purpose of conducting steam from the inner to the outer vessel, i. e., into the feathers. The said tubes project into the inner vessel for the purpose of preventing the water of condensation from passing into the feathers.

The invention also consists in arranging a tube within each of the aforesaid tubes, and in covering the outer end of the outer tube; also for the purpose of keeping the water from the feathers.

The invention also consists in branching the hollow shafts of the vessels, through which the steam is conducted into the same. This branching is for the purpose of enabling the conducting the steam into the feathers for cleaning, or into the annular space for drying purposes, a suitable faucet or valve in the branch regulating the flow and its direction.

The object of this invention is to provide a machine for cleaning and renovating feathers, which machine does not contain any inaccessible valves or complicated devices in its inside, which can be constructed at a moderate expense, and which is of simple construction; can be easily managed, and not easily be brought out of order.

A represents a cylindrical or polygonal vessel, made of sheet metal, wood, or any other suitable material, having solid heads $a\ a$ and a cover, $b$, in one of its sides, as is clearly shown in fig. 1. In the centre of each head is a short shaft, $d$, which has its bearings in a stationary frame, as shown by red lines in the drawings. In the vessel A are two sheet or cast-iron vessels B and C, concentric with the vessel A and with each other. Each axle, $d$, on each end of the vessel A, is hollow, and has two branches, $e$ and $f$, passing through the head of the vessel, as shown. The branch $e$ leads into the inner vessel B, the branch $f$ into the annular space formed between the vessels B and C. A valve or faucet $g$ in the pipe $d$, of suitable construction, connects the same with either one of the branches $e$ or $f$, and disconnects it from the other. The parts $d, e, f,$ and $g$ are alike in both ends of the vessel A; one serves to conduct steam into the apparatus, the other to discharge the water and surplus steam from the same. D D is a series of tubes fitted radially through the wheels B and C, so as to connect the vessel B with the annular space formed between the walls of the vessels A and C. The inner end of each tube D reaches close to or beyond the axis of the vessel, so that when the vessels are revolved water collected in the vessel B by the condensation of steam cannot flow into the tubes D unless it reaches a certain height, which is prevented by the open discharge. But still it may be possible that some water enters one of the tubes D, and to prevent its reaching the feathers, which are contained in the space between C and A, the outer end of each tube D is closed, only having a small tube, $h$, in its centre, as is clearly shown in the drawings. This small tube reaches a short distance into the interior of the tube D, and will prevent the flow of water to the feathers unless the same stands at a certain height in the tube D, while its outer head is down; and if the water does not stand quite high enough in the tube when the outer end of the said tube is down, as at 1 in fig. 2, the water will not flow into the feathers at all, as it is returned to the vessel B as soon as the outer end of the tube D is up, as at 2 in fig. 2. Thus no water will reach the feathers, which is a great improvement, and could never be completely obtained by the other machines now in use for the same purpose.

The operation is as follows: The feathers to be cleaned are placed through the door $b$ into the vessel A; the valve or faucet $g$ is turned so as to connect the pipes $d$ at both ends of the vessel with the vessel B. One pipe, $d$, is then connected with a suitable steam boiler, and the whole apparatus is revolved around the axis $d$. The steam then flows through the pipes $d$ and $e$ into the vessel B, and thence through the pipes D into the feathers, it being thoroughly distributed by the revolution of the device, the water of condensation flowing off through the opposite pipes $e$ $d$. When the feathers have been sufficiently steamed and cleaned the faucets $g$ are turned so as to connect the pipes $d$ with the pipes $f$. The steam will flow into the vessel C, and through the same, heating the walls of the same, and thereby drying the feathers. All the parts of this apparatus are made of any suitable material.

I claim as new, and desire to secure by Letters Patent—

1. The vessels A, B, and C, when arranged concentric with each other, and when provided with the tubes D and steam pipes $e$ and $f$, all made and operating substantially as and for the purpose herein shown and described.

2. The manner, herein shown and described, of arranging the tubes D, to prevent the water from flowing from an inner revolving vessel into an outer vessel, by extending the inner end of the tubes to or near to the axis of the inner vessel, by arranging a tube, $h$, within its outer end, and by closing the outer end around the tube $h$, as set forth.

3. The arrangement of the tubes $e$ and $f$, hollow axles $d$, and faucet or valve $g$, all being made so that the steam can be at will conducted to or discharged from the vessels B or C, substantially as set forth, for the purpose herein shown and described.

OSSIAN C. MONROE.

Witnesses:
WM. F. McNAMARA,
A. V. BRIESEN.